March 17, 1964
R. E. SNIDER
3,125,665
ELECTRODE TOOL
Filed May 3, 1962
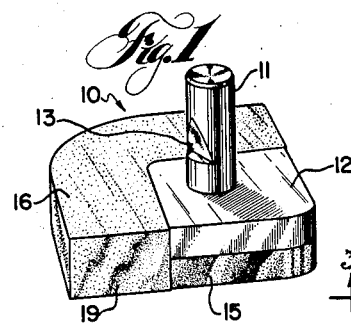
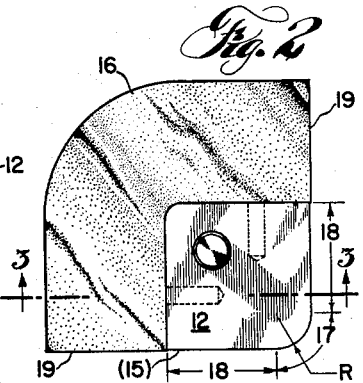
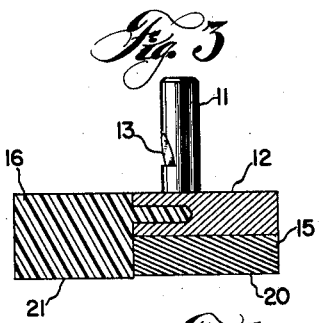
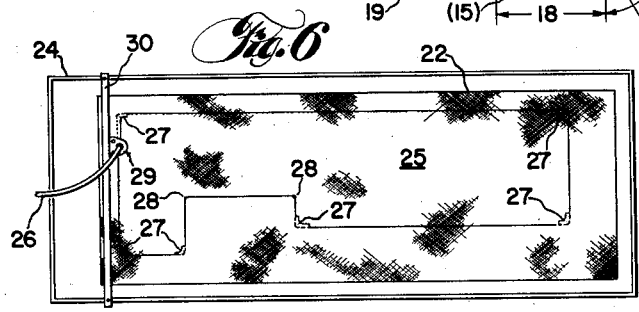
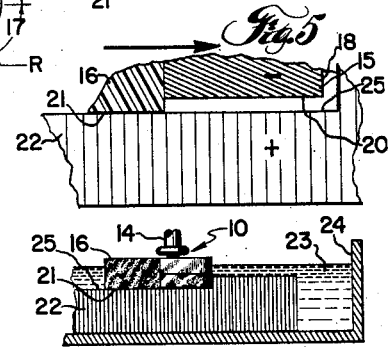
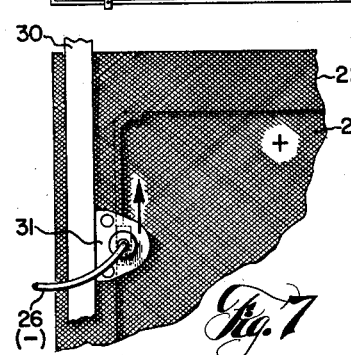
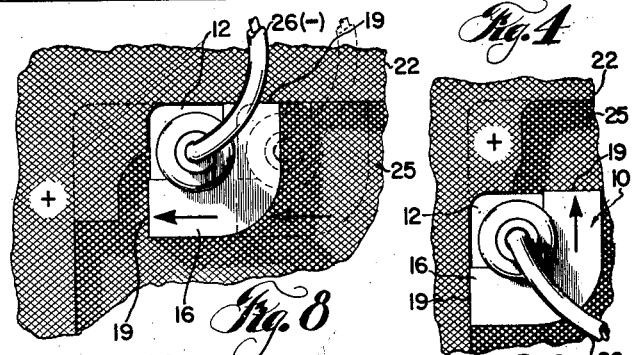
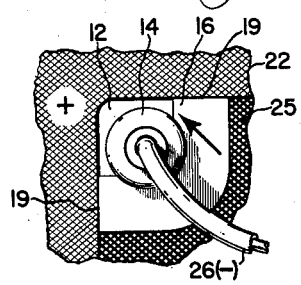
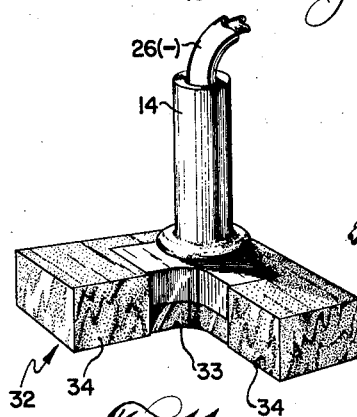
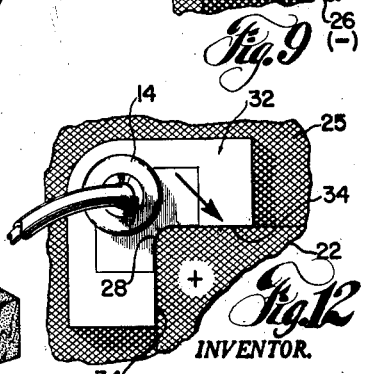
INVENTOR.
ROBERT E. SNIDER
BY
ATTORNEY

United States Patent Office 3,125,665
Patented Mar. 17, 1964

3,125,665
ELECTRODE TOOL
Robert E. Snider, Blacklick, Ohio, assignor to
North American Aviation, Inc.
Filed May 3, 1962, Ser. No. 192,277
4 Claims. (Cl. 219—69)

This invention concerns an electrode tool which may be used in connection with the machining of metal by an electrical discharge method.

It is an important object of the invention to provide an electrode tool which may be employed to accurately locate and form curved edges and the like located in the corner regions of metal workpiece recesses.

Another object of this invention is to provide an electrode tool which may be used without separate templates or the like to accurately locate corner edges and remove metal from corner regions of recesses provided in a metal workpiece.

A further object of this invention is to provide an electrode tool which may be used to obtain convenience and economy advantages when removing metal to form curved or contoured edges located in the corner regions of a workpiece recess.

Other objects and advantages of this invention will become apparent during consideration of the following description and drawings.

In the drawings:

FIG. 1 is a perspective view of one form of the electrode tool of this invention;

FIG. 2 is a plan view of the tool shown in FIG. 1;

FIG. 3 is a sectional view taken at line 3—3 of FIG. 2;

FIGS. 4 and 5 illustrate the elevational relationship which exists between the tool of this invention and a workpiece recess;

FIG. 6 is a plan view of an equipment arrangement for removing metal to form length and width edges of a steel honeycomb core workpiece recess;

FIG. 7 illustrates use of the equipment of FIG. 6 at an inside corner region of the workpiece recess also shown in FIG. 6;

FIGS. 8 through 10 illustrate use of the tool of FIG. 1 to form a corner edge in a honeycomb core workpiece recess inside corner region;

FIG. 11 illustrates another form of the electrode tool of this invention; and

FIG. 12 illustrates use of the electrode tool of FIG. 11 to form a corner edge by removing metal from an outside corner region of a honeycomb core workpiece recess.

This invention concerns an electrode tool which may be used to remove metal from workpieces which are to be provided with interiorly located recess regions. The invention has particular utility with respect to the removal of metal from corner regions which are located in such recesses to provide curved or contoured edge configurations thereat. The drawings illustrate two forms of the electrode tool of this invention. The form illustrated particularly in FIGS. 1 through 3 is employed for removing metal from a recess inside corner region to provide a uniform inside radius. The form of electrode tool illustrated in FIG. 11 is suited to the removal of metal from a workpiece recess corner region to provide an outside radius.

The tool 10 illustrated in FIG. 1 employs a stem 11 which is secured to or otherwise made a part of electrode head 12. A notch 13 is provided in stem 11 to facilitate retention of electrode tool 10 in a holder such as component 14 of FIG. 11. Holder 14 is provided to facilitate safe manual movement of electrode tool 10 in a workpiece recess. Electrode tool 10 also includes an electrode face member 15 and an electrode guide member 16. Both face 15 and guide member 16 are secured to electrode head 12 by a suitable adhesive or other fastening means. It is also recognized that electrode face 15 may be made an integral part of electrode head 12 in those instances where it is desired that a single electrode material may be advantageously employed. Head 12 and stem 11 are generally made of an electrically conducting metal such as brass. Electrode face 15 may also be made of a like metal. However, in practice, face member 15 is often fabricated by a machining or a casting technique using a material such as silver-tungsten alloy, copper-tungsten alloy, copper, steel, or aluminum. The selection of a particular metal or material for electrode face member 15 for a given application is considered within the skill of persons familiar with the art of removing metal by electrical discharge apparatus. Guide member 16 is preferably made of a comparatively hard material having an insulating or relatively poor electricity-conducting property. In one form of our invention we employ an epoxy resin which contains approximately five (5) parts of powdered aluminum for each part of epoxy resin. Face member 15 may be cemented to electrode head 12 using a conductive adhesive such as an epoxy resin loaded with silver.

The construction of electrode 10 shown in the drawings has other important features. Electrode face member 15 has a vertical face portion 17 defined by radius R. The configuration of face portion 17 corresponds to the curve or contour of the edge to be cut in a workpiece recess corner region. Face portion 17 is joined at either terminus by a vertical face portion 18 which is generally tangent thereto. The vertical face of electrode head 12 corresponds in contour to the shape of face portions 17 and 18 of electrode face member 15. The guide member 16 attached to electrode head 12 is provided with vertical face portions designated 19. Each face portion 19 is essentially a continuation of a face portion 18 of face member 15. In one form of my electrode tool invention faces 19 are flush with each face portion 18. However, for some applications I prefer that each face portion 19 of guide member 16 be offset outwardly from face portion 18 by a small distance. Electrode face member 15 and guide member 16 are provided with bottom surfaces 20 and 21, respectively. Bottom surface 21 projects below bottom surface 20 by a small distance. Such distances may be 0.003" in a typical application. The offset relations provided between the face portions of electrode face member 15 and the face portions of guide member 16 are employed to establish a breakdown potential gap between electrode tool and workpiece.

The electrode tool of this invention is combined with otherwise conventional components of typical electrical discharge machining equipment. Such equipment components include an electrical power supply which furnishes pulsed current at a prescribed frequency. In typical installations the equipment power supply operates at peak voltages of from 80 volts to 400 volts, at a total current extending up to 20 amperes, and at a frequency in the range of from 120 pulses per second to 130,000 pulses per second. In such arrangements the workpiece is electrically connected to one side (positive) of the power supply and the electrode tool to the negative side of the power supply. The workpiece and at least portions of the electrode tool are immersed in a dielectric liquid. Current flow is from electrode tool to workpiece. The high density of the current flow established by the dielectric fluid located in a gap between the electrode tool cutting face portions and the workpiece causes erosion or disintegration of adjacent workpiece metal. Portions of the conventional equipment arrangement are illustrated in FIGS. 4 and 5.

In FIG. 4 a steel honeycomb core workpiece 22 is shown in immersed relation to the dielectric liquid designated 23. Such liquid is contained in the pan designated 24. Electrode tool 10 is shown as cooperating with the upper surface and edge of a recess 25 provided in honeycomb core workpiece 22. The dielectric material 23 may be an organic fluid; in some applications distilled water may be used as the dielectric fluid. Electrode tool 10 is connected to the negative side of a conventional power supply (not shown) by the lead designated 26 (FIG. 8). The electrical connection of workpiece 22 to the positive side of the power supply is not shown. FIG. 5 illustrates the relation between electrode tool 10 and honeycomb core workpiece 22 of FIG. 4 in an exaggerated manner. The under-surface 21 of guide member 16 is shown in contacting relation to the upper surface of recess 25. The gap established between the under-surface 20 of electrode face member 15 and the upper surface of the recess in workpiece 22 is shown as an exaggerated detail. In the FIG. 5 illustration the vertical face portion 18 of electrode face member 15 is shown in spaced-apart relation to one edge of the workpiece recess. In typical applications the electrode tool 10 is advanced in the direction of the arrow of FIG. 5 until the vertical surface 19 of guide member 16 contacts the recess edge. FIGS. 6 and 7 illustrate a workpiece provided with a basic recess having all except required curved or contoured edges in the corner regions thereof completed. Conventional equipment for machining the straight length and width edges of a typical basic workpiece recess is illustrated in FIG. 6.

Workpiece 22 shown in FIG. 6 is immersed in dielectric fluid 23 contained in pan 24. Edges of recess 25 are developed using the conventional electrode tool 29 and the template means designated 30. The interior corner portions 27 and the exterior corner portions 28 of recess 25 are not machined to their desired contour using the FIG. 6, FIG. 7 apparatus arrangement. Template means 30 is shown as a straight edge which is secured to and supported by pan 24 in spaced-apart relation to the adjacent edge of recess 25. Electrode tool 29 is basically comprised of a follower portion 31 (FIG. 7) which contacts the edge of template means 30 and a straight-edged electrode face member carried thereby. The straight-edged portion of the electrode face member of electrode tool 29 is normally provided in spaced-apart relation to the edge of template means 30 nearest thereto. As noted in FIG. 7, tool 29 is advanced mostly in the direction of the arrow to form the desired edge of recess 25.

FIGS. 8 and 9 show one method of advancing electrode tool 10 into an unfinished interior corner region 27 of workpiece recess 25 to form the required corner edge contour. The tool may be advanced first in the direction of the arrow of FIG. 8 and afterwards along a path at a right angle thereto as in the direction of the arrow in FIG. 9. In each instance, the tool is moved to the point where surface portion 19 of guide member 16 contacts a previously-machined edge in recess 25. Use of the steps of FIGS. 8 and 9 will produce a recess having the contour configuration provided in the vertical face 17 of electrode face member 15. As an alternate technique, the tool may be advanced into the corner region generally in the direction of the arrow shown in FIG. 10. In either instance, the electrode tool advances to a point where surface portions 19 of the guide member contact the previously-machined edges of the recess. Machining of the recess corner region is completed at that time.

The electrode tool 32 of FIGS. 11 and 12 includes the same basic components as electrode tool 10 of FIGS. 1 through 3, except that the configuration of the vertical face portions of the head member, the face member, and the guide member are changed somewhat. In the FIGS. 11 and 12 embodiment, face member 33 is provided with a contour for machining an exterior corner region 28 of recess 25 (FIG. 6). The face portions 34 of the guide member of tool 32 are tangent to a uniform radius of the tool vertical face and are an extension of that face portion. It is required only that the tool be advanced in the recess in the direction of the arrow shown in FIG. 12.

Although the drawings illustrate surface configurations in electrode face member 15 which are developed by a simple uniform radius, other configurations or forms may be employed. Specific requirements as to face configuration are dictated by the desired characteristics of the workpiece recess rather than by the functioning of the electrode tool of this invention.

I claim:
1. In an electrode tool which conducts electrical energy to a dielectric gap of given depth positioned intermediate the tool and a workpiece surface to remove metal from the workpiece surface by electrical discharge machining, in combination:
   (a) An electrical energy-conducting face member which has a substantially flat bottom surface that partially defines said dielectric gap when said electrode tool cooperates with said workpiece surface,
   (b) A guide member which is electrically non-conducting in comparison to said face member and which has a substantially flat bottom surface which supports said electrode tool when said electrode tool cooperates with said workpiece surface, and
   (c) Means securing said guide member to said face member whereby said guide member bottom surface is positioned parallel to said face member bottom surface and is offset downwardly with respect to said face member bottom surface by a distance equal to said dielectric gap given depth.

2. The invention defined by claim 1, wherein said face member has an edge surface which intersects said face member bottom surface substantially at right angles and which partially defines said dielectric gap when said electrode cooperates with said workpiece, and wherein said guide member has an edge surface which intersects said guide member bottom surface substantially at right angles, said guide member edge surface being offset outwardly with respect to said face member edge surface by a distance equal to said dielectric gap given depth.

3. In an electrode tool which conducts electrical energy to a dielectric gap of given depth to remove metal from a bottom area and a contoured edge area of prescribed contoured configuration in a workpiece recess by electrical discharge machining, in combination:
   (a) An electrical energy-conducting face member which has a generally vertical edge area with a contoured configuration corresponding to said prescribed configuration,
   (b) A first generally vertical electrically non-conducting guide member portion having an edge area joining one extremity of said face member edge area in offset relation at the junction region,
   (c) A second generally vertical electrically non-conducting guide member portion having an edge area joining an opposite extremity of said face member edge area in offset relation at the junction region, and
   (d) Means securing said guide member portions edge area in fixed relation to said face member edge area, said guide member portions edge areas being offset outwardly relative to said face member edge area at said junction regions by a distance equal to said dielectric gap given depth.

4. The invention defined by claim 3, wherein said electrode tool face member has a generally horizontal electrical energy-conducting bottom area which intersects said face member edge area, and wherein said electrode tool guide member portions have a generally horizontal electrically non-conducting bottom area which intersects said guide member portions edge areas, said guide member portions bottom area being positioned downwardly with respect to said face member bottom area by a distance equal to said gap given depth and supporting said electrode tool when said electrode tool is cooperatively engaged with said workpiece.

References Cited in the file of this patent
UNITED STATES PATENTS

| | | |
|---|---|---|
| 1,914,280 | Myers | June 13, 1933 |
| 2,021,442 | Capomacchio et al. | Nov. 19, 1935 |
| 2,204,178 | Gartner | June 11, 1940 |
| 2,603,919 | Robinson | July 22, 1952 |
| 2,981,822 | Larkins | Apr. 25, 1961 |